United States Patent
Lin et al.

(10) Patent No.: US 9,684,406 B2
(45) Date of Patent: Jun. 20, 2017

(54) ELECTRONIC DEVICE SUITES, PROTECTIVE COVERS AND METHODS FOR OPERATING USER INTERFACE

(71) Applicant: Acer Incorporated, New Taipei (TW)

(72) Inventors: Jiunn-Jou Lin, New Taipei (TW); Yi-Wen Chen, New Taipei (TW)

(73) Assignee: ACER INCORPORATED, New Taipei (TW)

(*) Notice: Subject to any disclaimer, the term of this patent is extended or adjusted under 35 U.S.C. 154(b) by 81 days.

(21) Appl. No.: 14/692,311

(22) Filed: Apr. 21, 2015

(65) Prior Publication Data
US 2016/0224169 A1  Aug. 4, 2016

(30) Foreign Application Priority Data
Jan. 29, 2015  (TW) .............................. 104102969 A

(51) Int. Cl.
G06F 3/041 (2006.01)
G06F 3/048 (2013.01)
G06F 3/0488 (2013.01)

(52) U.S. Cl.
CPC .......... *G06F 3/0416* (2013.01); *G06F 3/0488* (2013.01); *G06F 2203/04803* (2013.01)

(58) Field of Classification Search
CPC ................. G06F 3/0416; G06F 3/0488; G06F 2203/04803; G09G 5/003; G09G 2300/04; G09G 2330/021
See application file for complete search history.

(56) References Cited

U.S. PATENT DOCUMENTS

2014/0268517 A1* 9/2014 Moon ...................... H05K 7/00
                                                         361/679.01
2014/0274214 A1* 9/2014 Kim .................... H04M 1/0266
                                                         455/566

(Continued)

FOREIGN PATENT DOCUMENTS

CN        103637529 A       3/2014
CN        104053326 A       9/2014
(Continued)

OTHER PUBLICATIONS

Chinese language office action dated Feb. 7, 2017, issued in application No. TW 104102969.

*Primary Examiner* — Ariel Balaoing
(74) *Attorney, Agent, or Firm* — McClure, Qualey & Rodack, LLP

(57) ABSTRACT

A method for operating a user interface, adapted to an electronic device. The steps include: receiving a wake-up signal; enabling a proximity sensing unit; determining whether the sensing value is greater than a predetermined value or not; displaying an application program in a first display area of a display unit by a processing unit and detecting a touch event corresponding to one of a plurality of sensing objects only by a second touching sensing area of a touch-sensing unit when the sensing value is greater than the predetermined value; obtaining a touch position corresponding to the touch event; and enabling an operation of the application program by the processing unit according to the touch position. A first touch-sensing area of the touch-sensing unit corresponds to the first display area, and the second touch-sensing area corresponds to a second display area.

11 Claims, 5 Drawing Sheets

(56) References Cited

U.S. PATENT DOCUMENTS

| | | |
|---|---|---|
| 2015/0138135 A1 | 5/2015 | Gan |
| 2015/0263776 A1* | 9/2015 | Shyu .................... A45C 13/002 455/575.8 |
| 2015/0362959 A1 | 12/2015 | Popescu |
| 2016/0277053 A1* | 9/2016 | Wong Chee ......... H04B 1/3888 |
| 2017/0024070 A1 | 1/2017 | Moon et al. |

FOREIGN PATENT DOCUMENTS

| | | |
|---|---|---|
| CN | 104090633 A | 10/2014 |
| JP | 2003-216299 A | 7/2003 |
| JP | 2012-18478 A | 1/2012 |
| TW | 201432557 A | 8/2014 |

\* cited by examiner

ELECTRONIC DEVICE SUITES, PROTECTIVE COVERS AND METHODS FOR OPERATING USER INTERFACE

CROSS REFERENCE TO RELATED APPLICATIONS

This Application claims priority of Taiwan Patent Application No. 104102969, filed on Jan. 29, 2015, the entirety of which is incorporated by reference herein.

BACKGROUND OF THE INVENTION

Field of the Invention

The application relates in general to an electronic device suite, a protective cover, and a method for operating a user interface, and in particular to an electronic device suite, a protective cover, and a method for operating a user interface for enabling an operation of a smart phone by touching the physical buttons set on a protective cover.

Description of the Related Art

These days, due to the rapid development of technology, electronic devices are widely used. Many users buy a protective cover for protecting the screen of their device, but most protective covers are only used to protect the electronic device, to display the time or information about the weather through a window in the front of the protective cover, or to wake-up/sleep the electronic device. When users want to execute simple functions, it is inconvenient due to the fact that they must open the front cover and wake the electronic device before executing any operations. Thus, how to simplify the steps for enabling the operation of some application programs when the electronic device is protected by the protective cover is a problem which needs to be solved immediately.

BRIEF SUMMARY OF INVENTION

An embodiment of the invention provides an electronic device suite comprising a protective cover and an electronic device. The protective cover comprises a front cover and a back cover. The front cover comprises a window and an operating area. The operating area has a plurality of sensing objects. The back cover connects to the front cover. The electronic device configured on the front cover comprises a proximity sensing unit, a display unit, a touch-sensing unit and a processing unit. The proximity sensing unit detects a sensing value corresponding to the relationship between the front cover and the electronic device. The display unit comprises a first display area and a second display area. The touch-sensing unit comprises a first touch-sensing area and a second touch-sensing area. The first touch-sensing area corresponds to the first display area, and the second touch-sensing area corresponds to the second display area. The processing unit determines whether the sensing value is greater than a predetermined value or not. The processing unit enables a first application program and displays the first application in the first display area when the sensing value is greater than the predetermined value. The processing unit further enables operation of the first application program only according to the touch position of the touch event corresponding to the sensing objects detected by the second touch-sensing area.

Another embodiment of the invention provides a method for operating a user interface, adapted to an electronic device, the steps comprising: receiving a wake-up signal; enabling a proximity sensing unit; determining whether the sensing value is greater than a predetermined value or not; displaying an application program in a first display area of a display unit by a processing unit and detecting a touch event corresponding to one of a plurality of sensing objects only by a second touching sensing area of a touch-sensing unit when the sensing value is greater than the predetermined value, wherein the first touch-sensing area of the touch-sensing unit corresponds to the first display area, and the second touch-sensing area corresponds to a second display area; obtaining a touch position corresponding to the touch event; and enabling operation of the application program by the processing unit according to the touch position.

Another embodiment of the invention provides a protective cover, adapted to an electronic device, comprising a front cover and a back cover. The front cover comprises a window and an operating area. The operating area has a plurality of sensing objects. The back cover connects to the front cover. The first display area of the electronic device corresponds to the window, and the second display area corresponds to the operating area. When the electronic device is covered with the front cover, the electronic device enables operation of an application program only according to a touch event within the operating area.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas in which the present devices and methods can be applied will become apparent from the following detailed description. It should be understood that the detailed description and specific examples, while indicating exemplary embodiments of the electronic device suite, the protective cover, and the method for operating the user interface, are intended for the purposes of illustration only and are not intended to limit the scope of the invention.

Figure 1:
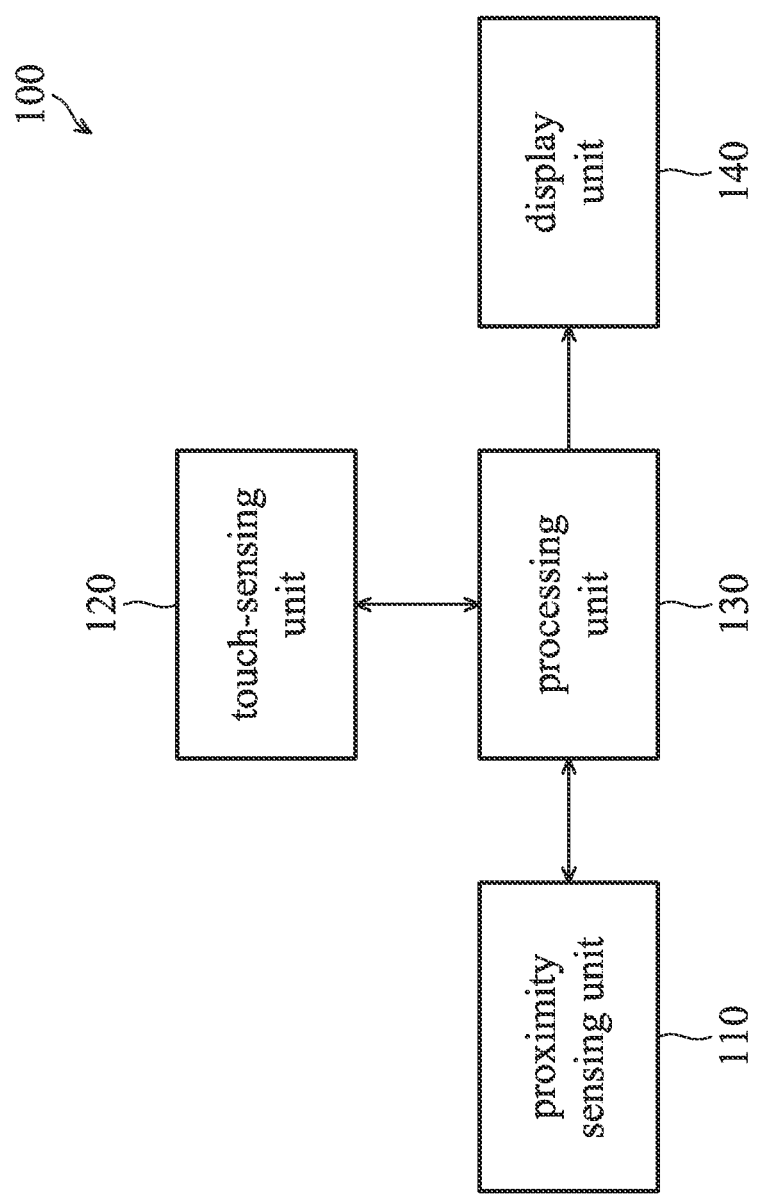
FIG. 1 is a block diagram of the electronic device in accordance with an embodiment of the invention.

FIG. 1 is a block diagram of the electronic device 100 in accordance with an embodiment of the invention. The electronic device 100 comprises a proximity sensing unit 110, a touch-sensing unit 120, a processing unit 130, and a display unit 140. The electronic device 100 can be a personal digital assistant (PDA), a mobile phone, a smartphone, a notebook computer, a tablet, a game device, etc. The proximity sensing unit 110 detects the relationship between an object such as the front cover, and the electronic device 100. The touch-sensing unit 120 detects a touch event of at least one touching object. The processing unit 130 enables an application program according to the sensing value, and enables operation of the application program according to a touch position of the touching object. The display unit 140 displays the application program.

Figure 2A:
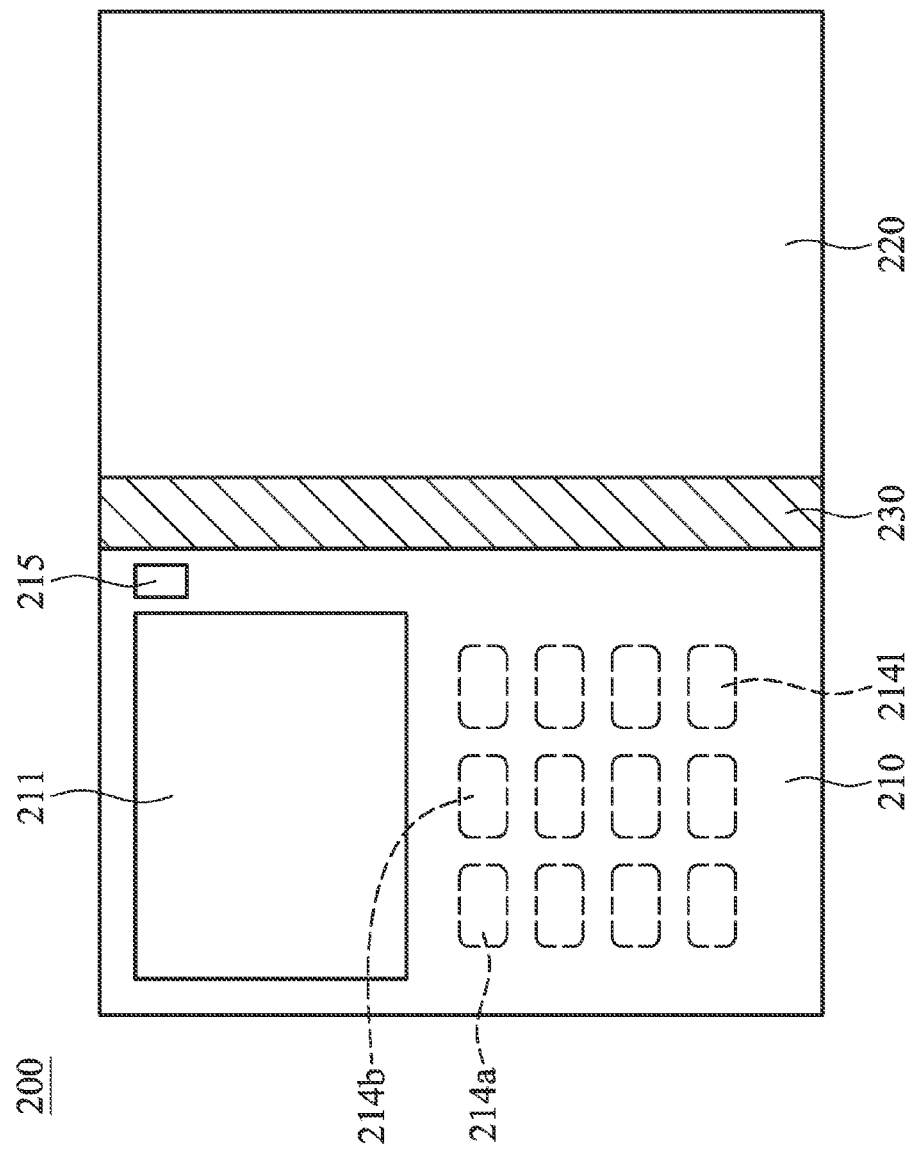
FIGS. 2A and 2B are schematic diagrams of the protective cover in accordance with an embodiment of the invention.
Figure 2B:
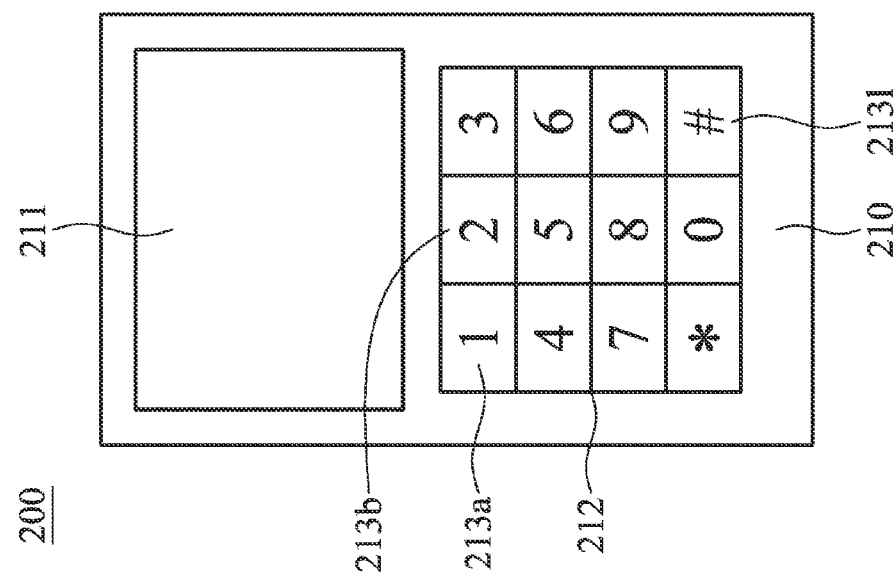

FIGS. 2A and 2B are schematic diagrams of the protective cover in accordance with an embodiment of the invention.

The protective cover 200 comprises a front cover 210, a back cover 220 and a side piece 230. The front cover comprises a window 211, an operating area 212 and a magnet 215. The window 211 can be an empty area or a window made by transparent material. The operating area 212 has a plurality of sensing objects 214a-214n (shown in dashed lines) which are projected over the inside of the front cover 210. The material of the sensing objects can be rubber, conductive cotton, conductive fibers, etc. The magnet 215 corresponds to the proximity sensing unit 110 of the electronic device 100, and couples to the proximity sensing unit 110 when the electronic device 100 is covered with the front cover 210. According to an embodiment of the present invention, the proximity sensing unit 110 is a Hall-Effect sensor. The proximity sensing unit 110 is used to find out that the front cover 210 is far from or close to the electronic device 100 according to the variation of the magnetic field due to the Hall-Effect sensor being used to measure the changes in the magnetic field. It should be noted that the combination of the magnet 215 and the Hall-Effect sensor is only an embodiment of the present invention, and a person skilled in the art can complete the purpose of the combination by using other components. The back cover of the electronic device 100 fits with the back cover 220 or sets in a case of the protective cover 200 for fixing the electronic device 100. The side piece 230 connects the front cover 210 and the back cover 220. The electronic device 100 is folded in the front cover 210, the back cover 220 and the side piece 230.

FIG. 2B is the front view of the front cover 210 of the protective cover 200 in accordance with an embodiment of the invention. As shown in FIG. 2B, the operating area 212 has the plurality of sensing objects 213a~213n. The sensing objects 213a~213l correspond to the sensing objects 214a~214l shown in FIG. 2A. The sensing objects 213a~213l show the icons corresponding to different operating instructions. For example, the sensing objects can show the icons corresponding to the call functions, the keypad of the numbers, or the letters of a~z. It should be noted that the numbers of the sensing objects can be changed according to different functions of the protective cover.

Figure 3:
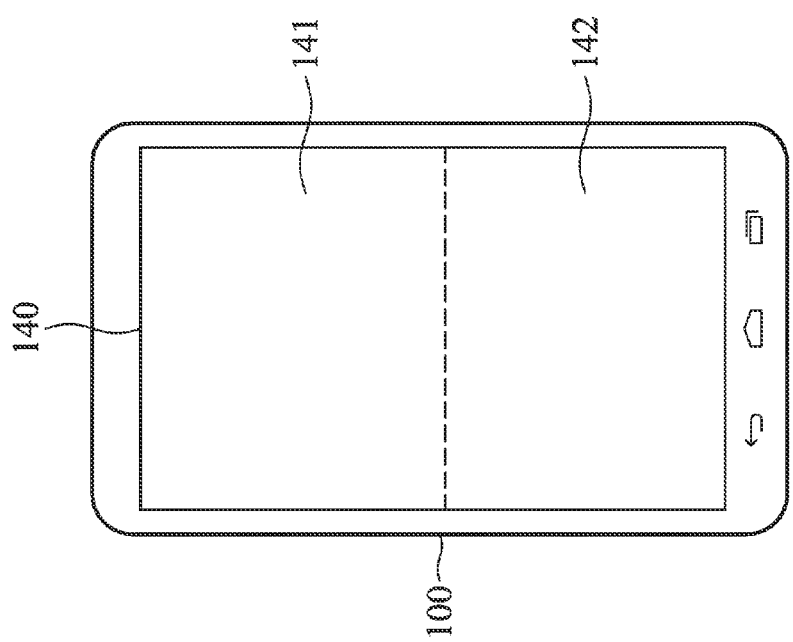
FIG. 3 is a schematic diagram of the electronic device in accordance with an embodiment of the invention.

FIG. 3 is a schematic diagram of the electronic device 100 in accordance with an embodiment of the invention. As shown in FIG. 3, the display unit 140 comprises a first display area 141 and a second display area 142. The first display area 141 corresponds to the window 211 of the front cover 210 of the protective cover 200. The second display area 142 corresponds to the operating area 212 of the front cover 210 of the protective cover 200.

According to an embodiment of the present invention, when the processing unit 130 receives a wake-up signal, such as the user pressing the open button of the electronic device 100 or any button which can wake up the electronic device 100, the processing unit 130 enables the proximity sensing unit 110 for determining the relationship between the proximity sensing unit 110 and the magnet 215 of the front cover 210 of the protective cover 200, i.e. determining whether the display unit 140 of the electronic device 100 is covered with the front cover 210 of the protective cover 200. The processing unit 130 determines that the display unit 140 of the electronic device 100 is not covered with the front cover 210 of the protective cover 200 when the sensing value received by the proximity sensing unit 110 is less than a predetermined value, and then the processing unit 130 enters a normal mode, and the display unit 140 displays an unlock screen or goes to a normal user interface, and the touch-sensing unit 120 receives the touch signal corresponding to any touch event.

Otherwise, the processing unit 130 determines that the display unit 140 of the electronic device 100 is covered with the front cover 210 of the protective cover 200, which means that the magnet 215 is coupled to the proximity sensing unit 110, when the sensing value received by the proximity sensing unit 110 is greater than or equal to the predetermined value, and the processing unit 130 enters a specific operating mode, and the processing unit 130 only enables a specific application program in the first display area 141 and further disables the display function of the second display area 142. For example, the dial screen of the call function, the screen of the calculator or the text screen of the message is displayed in the first display area 141, and the second display area 142 displays nothing in order to reduce power consumption. Furthermore, the touch-sensing unit 120 shadows the sensing signal corresponding to the window 211, or the processing unit 130 ignores the sensing signal when receiving the sensing signal from the window 211. The processing unit 130 further segments the operating area 212 of the touch-sensing unit 120 into a plurality of sub-areas according to the positions of the sensing objects 214a~214l, and configures the sub-areas with different functions. For example, when the processing unit 130 executes the call function, the operating area 212 is segmented into 12 sub-areas corresponding to the sensing objects 214a~214l, and the sub-areas are configured with the function of a keypad with buttons numbered 0~9 and a call button, and the processing unit 130 further enables the function according to the touch position of the touch events.

According to another embodiment of the present invention, when the processing unit 130 is working in the normal mode, the processing unit will go to the specific operating mode rather than entering the sleep mode when the proximity sensing unit 110 detects that the magnet 215 is closing, i.e. the user covers the protective cover 200 on the display unit 140 in the normal mode.

Figure 4:
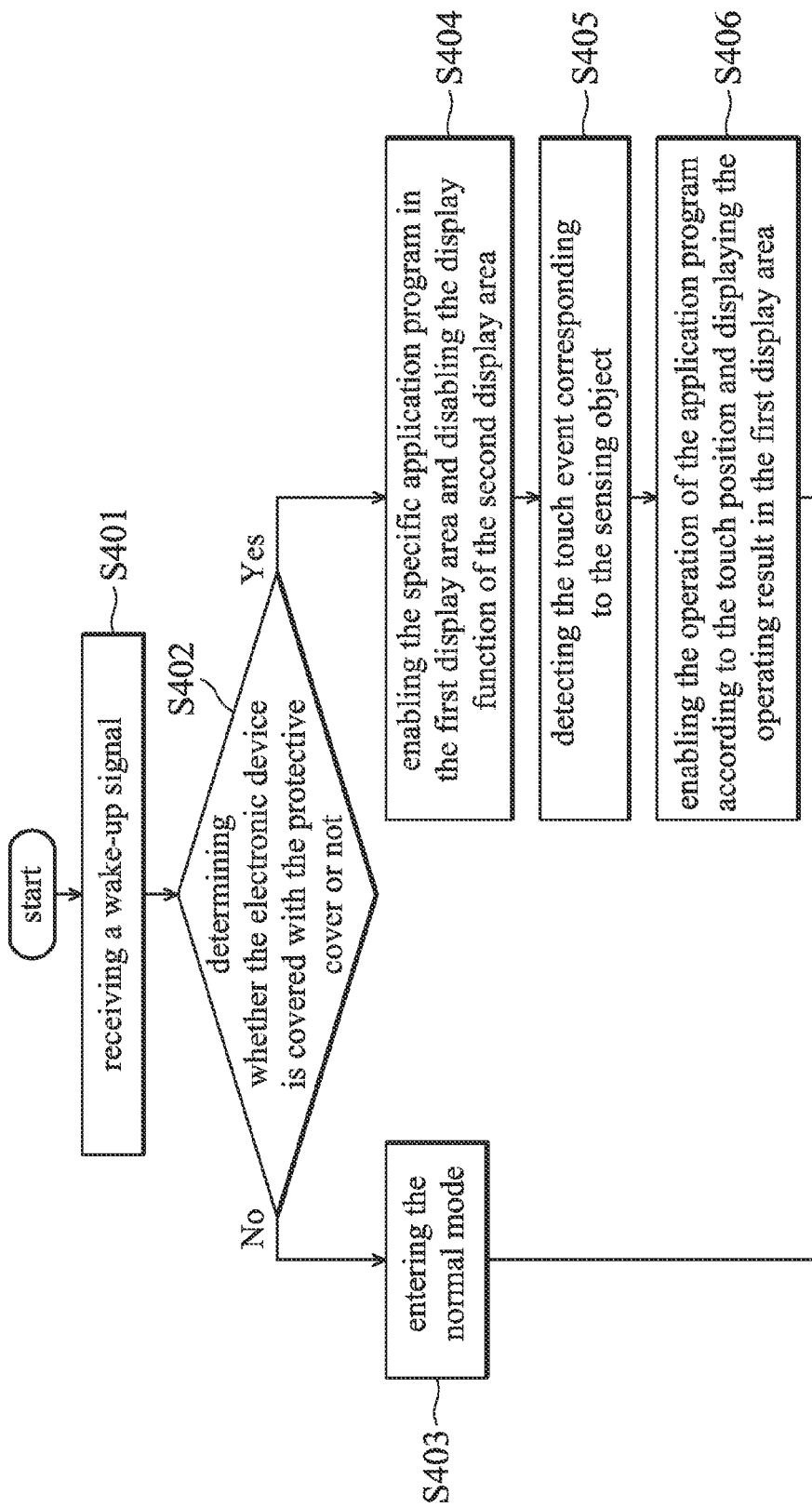
FIG. 4 is a flow chart of the method for operating the user interface in accordance with an embodiment of the invention.

Please refer to FIG. 4 with FIG. 1. FIG. 4 is a flow chart of the method for operating the user interface in accordance with an embodiment of the invention. In step S401, the processing unit 130 receives a wake-up signal, such as the user pressing the open button of the electronic device 100 or any button which can wake the electronic device 100. In step S402, the processing unit 130 enables the proximity sensing unit 110, and the proximity sensing unit 110 detects the relationship between the magnet 215 of the front cover 210 of the protective cover 200 and the electronic device 100, i.e. determining whether the display unit 140 of the electronic device 100 is covered with the front cover 210 of the protective cover 200. When the sensing value received by the proximity sensing unit 110 is less than the predetermined value, the method proceeds to S403, the processing unit determines that the display unit 140 of the electronic device 100 is not covered with the front cover 210 of the protective cover 200, and enters the normal mode, that the display unit 140 displays an unlock screen or goes to a normal user interface, and the touch-sensing unit 120 receives the touch signal corresponding to any touch event. Otherwise, when the sensing value received by the proximity sensing unit 110 is greater than the predetermined value, the method proceeds to S404, the processing unit 130 determines that the display unit 140 of the electronic device 100 is covered with the front cover 210 of the protective cover 200, which means the magnet 215 is coupled to the proximity sensing unit 110, and the processing unit 130 enters the specific operating mode, and the processing unit 130 only enables the specific application program in the first display area 141 and further disables the display function of the second display area 142. For example, the interface of the call function, the calculator or the message is displayed in the first display area 141, and the second display area 142 displays nothing in order to reduce power consumption. In step S405, the touch-sensing unit 120 detects the touch event corresponding to the sensing object 213a~213n, and obtains the touch position corresponding to the touch event. In step S406, the processing unit 130 enables the operation of the application program according to the touch position, and displays the operating result in the first display area 141.

As described above, an embodiment of the invention provides an electronic device suite, a protective cover, and a method for operating the user interface. When the electronic device is covered with the protective cover, the user can wake the electronic device to make sure it enters a specific operating mode, and execute the operation of the specific application program by pressing the physical buttons set on the protective cover for simplifying the complexity of the unlocking steps. Furthermore, the power consumption can be reduced by displaying the operating screen only in the window.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An electronic device suite, comprising:
a protective cover, comprising:
a front cover, comprising a window and an operating area, wherein the operating area has a plurality of sensing objects; and
a back cover, connected to the front cover;
an electronic device, configured on the front cover, comprising:
a proximity sensing unit, adapted to detect a sensing value corresponding to a relationship between the front cover and the electronic device;
a display unit, comprising a first display area and a second display area;
a touch-sensing unit, comprising a first touch-sensing area and a second touch-sensing area, wherein the first touch-sensing area corresponds to the first display area and the second touch-sensing area corresponds to the second display area; and
a processing unit, adapted to determine whether the sensing value is greater than a predetermined value or not, wherein the processing unit enables a first application program and displays the first application in the first display area when the sensing value is greater than the predetermined value, and enables an operation of the first application program according to a touch position of a touch event corresponding to the sensing objects detected by the second touch-sensing area;
wherein when the sensing value is greater than the predetermined value, the touch-sensing unit shadows or the processing unit ignores a sensing signal received from the window.

2. The electronic device suite as claimed in claim 1, wherein the processing unit ignores other touch events within the first touch-sensing area when the sensing value is greater than the predetermined value.

3. The electronic device suite as claimed in claim 1, wherein the display unit is covered with the front cover when the sensing value is greater than the predetermined value.

4. The electronic device suite as claimed in claim 1, wherein the processing unit enables the operation according to the touch event within the first touch-sensing area and the second touch-sensing area when the sensing value is less than the predetermined value.

5. The electronic device suite as claimed in claim 1, wherein the proximity sensing unit is a Hall-Effect sensor.

6. A method for operating a user interface, adapted to an electronic device, comprising:
receiving a wake-up signal;
enabling a proximity sensing unit;
determining whether the sensing value received by the proximity sensing unit is greater than a predetermined value or not;
displaying a first application program in a first display area of a display unit by a processing unit and detecting a touch event corresponding to one of a plurality of sensing objects only by a second touch-sensing area of a touch-sensing unit when the sensing value is greater than the predetermined value, wherein a first touch-sensing area of the touch-sensing unit corresponds to the first display area, and the second touch-sensing area corresponds to a second display area of the display unit;
obtaining a touch position corresponding to the touch event; and
enabling an operation of the application program by the processing unit according to the touch positions;
wherein when the sensing value is greater than the predetermined value, the touch-sensing unit shadows or the processing unit ignores a sensing signal received from the first touch-sensing area.

7. The method as claimed in claim 6, wherein the processing unit ignores other touch events within the first touch-sensing area when the sensing value is greater than the predetermined value.

8. The method as claimed in claim 6, wherein the display unit is covered with a front cover when the sensing value is greater than the predetermined value.

9. The method as claimed in claim 6, wherein the processing unit enables the operation according to the touch event within the first touch-sensing area and the second touch-sensing area when the sensing value is less than the predetermined value.

10. The method as claimed in claim 6, wherein the proximity sensing unit is a Hall-Effect sensor.

11. A protective cover, adapted to an electronic device, comprising:
a front cover, comprising a window and an operating area, wherein the operating area has a plurality of sensing objects; and
a back cover, connected to the front cover;
wherein a first display area of the electronic device corresponds to the window and the second display area corresponds to the operating area, and the electronic device enables an operation of an application program only according to a touch event within the operating area when the electronic device is covered with the front covers;
wherein when a sensing value detected by the electronic device is greater than the predetermined value, the electronic device shadows or ignores a sensing signal received from the window.

* * * * *